United States Patent [19]

Barattini et al.

[11] Patent Number: 4,958,886
[45] Date of Patent: Sep. 25, 1990

[54] ELASTIC FOLDABLE COVERS FOR MOTORCAR SEATS

[76] Inventors: Anna Barattini, No. 64, Via S. Maria in Monticelli; Anna M. Rossi, No. 35, Via Filippo Marchetti, both of Rome, Italy

[21] Appl. No.: 392,282

[22] Filed: Aug. 11, 1989

[30] Foreign Application Priority Data

Sep. 21, 1988 [IT]  Italy ............................... 35914/88[U]

[51] Int. Cl.5 .............................................. A47C 31/11
[52] U.S. Cl. ...................................... 297/229; 297/224
[58] Field of Search ............... 297/229, 224, 223, 219, 297/218

[56] References Cited

U.S. PATENT DOCUMENTS

| | | | |
|---|---|---|---|
| 1,970,820 | 8/1934 | Schoellkopf | 297/229 X |
| 2,270,598 | 1/1942 | Morgan | 297/229 |
| 4,693,511 | 9/1987 | Seltzer et al. | 297/224 X |
| 4,718,721 | 1/1988 | Pompa | 297/229 |

Primary Examiner—Peter R. Brown
Attorney, Agent, or Firm—Wenderoth, Lind & Ponack

[57] ABSTRACT

Cover members are provided for use on car seats and are made of an elastic material, have a shape which is adaptable to any seat type, are provided at low interior parts thereof with sets of members for tightening the cover members themselves and are foldable so as to be capable of being housed and transported in small size storage bags.

10 Claims, 2 Drawing Sheets

ELASTIC FOLDABLE COVERS FOR MOTORCAR SEATS

BACKGROUND OF THE INVENTION

The present invention relates to elastic foldable cover members for car seats.

More particularly, this invention relates to a set of cover members for all car seats, which cover members are suitable for being readily mounted on seats irrespective of the seat type or size.

As is well known, it is often necessary to cover car seats with slip-covers, particularly when the weather is hot and people are often getting into the car with wet clothes on; when the car is to be used for transporting children, animals, and cumbersome and unclean articles; and when the car owner dislikes the material or the color of the car seats.

In order to solve such problems, seat cover members are presently commercially available and are manufactured from a wide variety of materials, but the materials are generally of considerable weight and stiffness and must be manufactured in different sizes according to the seat type on which they are to be mounted. Furthermore, car seat fabrics are often quite neutral and banal in color.

Such cover members generally take a considerable amount of time to mount to the seat, as the seams of the cover members themselves must be fitted to the seats by successively adjusting the cover members until they are properly aligned on the seats.

Also, because of the type of material used and the fact that the cover members commercially available at present, unless tailor-made, never properly fit the seats, the cover members tend to create problems for the user while travelling.

In addition, one of the major disadvantages of the presently known car seat cover members is that the cover members, when not installed on the car seats, are considerably cumbersome, thus making it difficult for both the retailer and the user to store them. This often limits the retailers to initially supplying only sample-books of seat cover fabrics.

It is therefore evident that there is a need for car seat cover members which are adaptable to any type of seat, which may be readily put on and taken off, and which are provided with a fastening system which allows them to be mounted to seats of any shape.

SUMMARY OF THE INVENTION

In order to overcome the above disadvantages, it is suggested, according to the present invention, that car seat cover members be manufactured of an elastic material and have shapes which are adaptable to the shape of any seat type. Furthermore, they should be provided in the lower interior parts thereof with sets of members for tightening the cover members themselves, and should be foldable so as to be capable of being housed and transported in a small size storage bag which, when filled, may also be used as a cushion for car passengers and which when empty may be easily utilized to carry various articles which may be useful during a trip.

It is therefore a specific object of the present invention to provide cover members for covering car seats, each comprising a back portion, a cushion portion and a bottom portion, characterized in that the back portion comprises a front portion and a rear portion of the same length. The front portion and the rear portion are connected along their sides and upper edges by a first continuous seam. The lower edge of the front portion of the back portion is connected with the rear end of the cushion portion by a second continuous seam which is adapted to extend down into the gap formed between a seat back and seat cushion. The cushion portion and bottom portion are connected along their sides and front ends by a third continuous seam.

The first, second and third continuous seams each terminate in first and second ends; each of the first ends joining the other first ends at a common point and each of the second ends joining the other second ends at a common point. The two common joining points are at opposite ends of the lower edge of the rear portion of the back portion.

First elastic rings or the like are connected to the lower edge of the rear portion of the back portion, second elastic rings or the like are connected to the second continuous seam and extend downwardly therefrom, and the first and second elastic rings are connected to each other by a hook member or members.

Advantageously, the cover members according to the present invention are intended to cover both front and rear seats.

Also, according to this invention a storage bag is provided for transporting and housing the cover members.

BRIEF DESCRIPTION OF THE DRAWING FIGURES

The present invention will now be described with reference to the accompanying drawings, wherein.

DETAILED DESCRIPTION OF THE INVENTION

Figure 1:
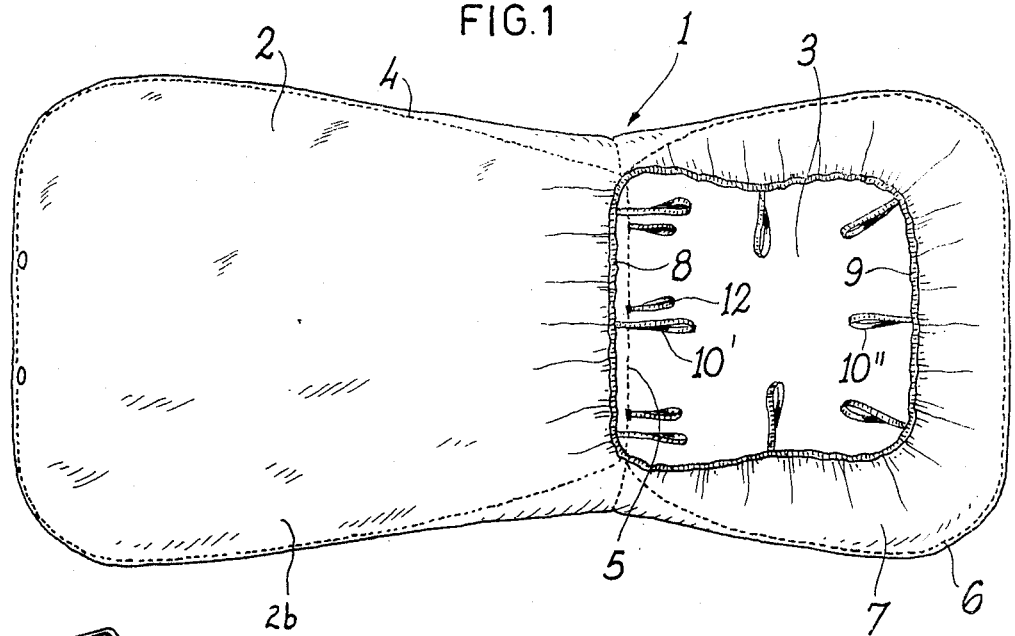
FIG. 1 shows a rear view of a non-installed cover member in accordance with the present invention.

FIG. 1 shows a cover member 1 which is intended to cover one of the two car front seats.

Such a cover member 1 includes a back portion 2, a cushion portion 3 and a substantially U-shaped bottom portion 7. The back portion is intended to be installed on the back of the car seat and the cushion portion and bottom portion are intended to be installed on the cushion of the car seat.

The back portion 2 includes front 2a and rear 2b portions which are connected together along their sides and upper edges by a first continuous seam 4.

This arrangement allows the back portion to be fitted on any seat type, irrespective of the shape or the thickness thereof, simply by sliding back portion 2 onto the seat back from the top end thereof. The back portion fits especially well when the fabric used is an elastic material.

Figure 3:
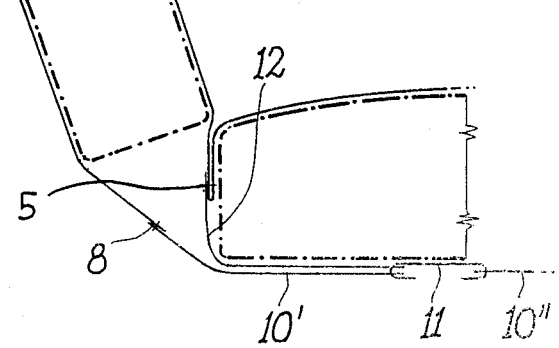
FIG. 3 shows a detail view of the hooking part of a cover member to the present invention.

The lower edge of the front portion 2a of back portion 2 is connected with the rear end of cushion portion 3 by a second continuous seam 5 which is adapted to extend down into the gap formed between a seat back and seat cushion as shown in FIG. 3.

The cushion portion 3 and the bottom portion 7 are connected together along their sides and front ends by a third continuous seam 6 which is arranged so as to be concealed under the peripheral edge of the seat cushion. The bottom portion 7 is adapted to cover the bottom part of the seat cushion and connect at its rear end with the lower edge 8 of the rear portion 2b of the back portion 2.

The first, second and third continuous seams each have first and second ends. The first end of each of the seams is joined with the first ends of the other seams and the second end of each of the seams is joined with the second ends of the other seams. The points at which the three seams join are located at opposite ends of the lower edge 8 of the rear portion 2b of the back portion 2.

An opening is defined in the bottom of the cover member by the lower edge 8 of the rear portion 2b, as well as by the edge 9 formed along the inside of the U-shape of the bottom portion 7. A single elastic tape is connected along the edges 8 and 9 and a set of elastic rings 10' and 10" are fastened thereto.

Figure 2:
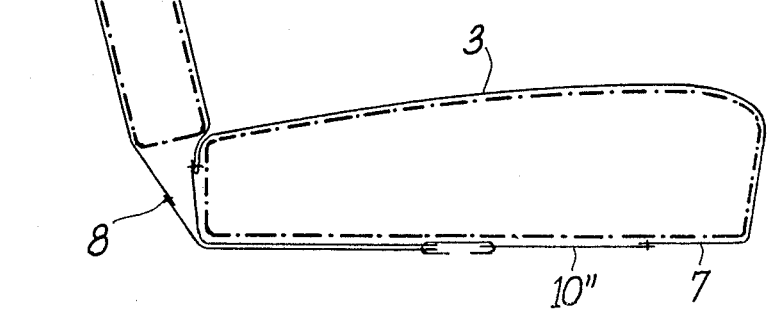
FIG. 2 shows a schematic side view of a car seat with a cover member being fastened thereon.
Figure 4:
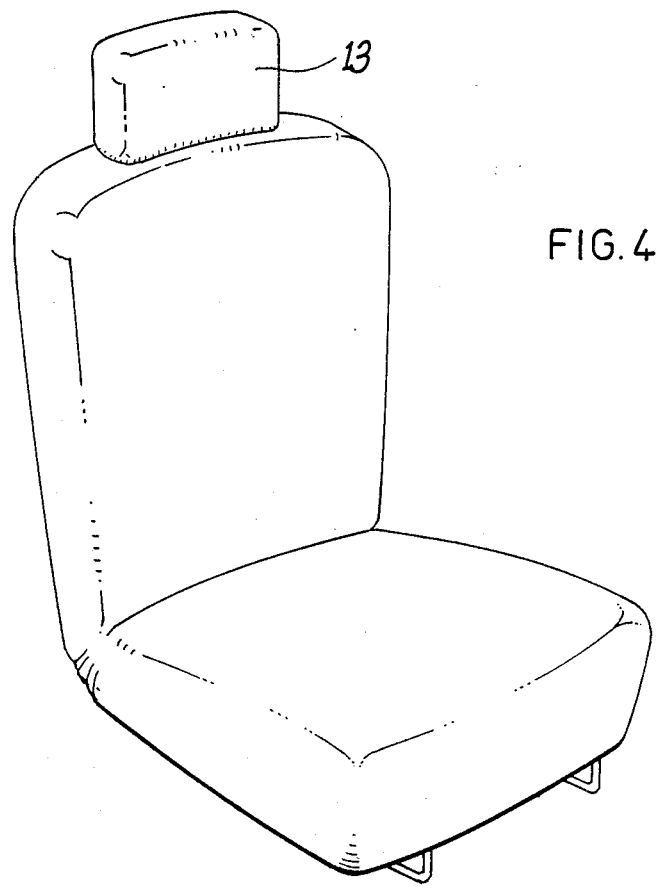
FIG. 4 shows a perspective view of a front car seat with a cover member arranged thereon according to the present invention.

As shown in FIGS. 2 and 3, the elastic rings 10' and 10" respectively provided on the edges 8 and 9 of the portions 2 and 7 are connected together by a hook member or members 11 schematically illustrated in FIG. 3. This is the only connection necessary to maintain the seat cover member in place on the car seat.

In addition, in order to ensure that the back portion 2 is well fitted to the seat, elastic rings 12 are provided along the second continuous seam 5 and are connected by the same hook member or members 11 which connect the elastic rings 10' and 10".

This arrangement allows the user to fit and tighten the back portion 2 from below the seat through the interior of the cover, thus making it easier to install the cover properly.

A headrest cover member 13 may also be provided and should be formed so that it can be firmly fastened and adapted to the shape of virtually any headrest.

Figure 5:
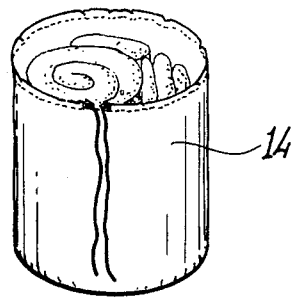
FIG. 5 shows a perspective view of an opened storage bag for the cover members.
Figure 6:
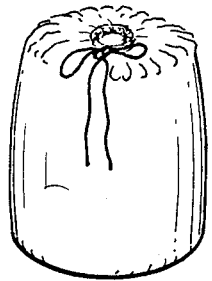
FIG. 6 shows the same storage bag in a closed position.

In FIGS. 5 and 6, a storage bag 14 is illustrated in an open configuration and in a closed configuration, respectively. In a preferred embodiment, the storage bag consists of the same material as the cover members and is adapted to hold all of the cover members intended to cover the front and rear car seats, as well as the head rests. The storage bag is very small and can be readily transported and stored in a car trunk.

In addition, in a preferred embodiment, the aforesaid cover members are manufactured of fancy colored elastic fabrics.

Preferred embodiments of the present invention have been disclosed for illustrative rather than restrictive purposes, but it is to be understood that changes and/or modifications can be made to the invention by those who are skilled in the art without departing from the scope of the appended claims.

We claim:

1. A car seat cover comprising:
   a seat back cover portion including a front portion having first and second sides and upper and lower edges, and a rear portion having first and second sides and upper and lower edges, said front portion being connected to said rear portion by a first continuous seam extending along said first and second sides and said upper edges of both of said front and rear portions;
   a seat cushion cover portion, having first and second sides and front and rear ends, connected to said front portion by a second continuous seam extending along said lower edge of said front portion and said rear end of said seat cushion cover portion; and
   a seat bottom cover portion, having first and second sides and a front end, connected to said seat cushion cover portion by a third continuous seam extending along said first and second sides and said front ends of both said seat bottom cover portion and said seat cushion cover portion, each of said first, second and third continuous seams having a first and a second end, each first end being joined with the other first ends at a first common point and each second end being joined with the other second ends at a second common point.

2. A car seat cover as recited in claim 1, wherein said seat bottom cover portion is substantially U-shaped and has an edge defined along an inside portion of the U-shape, said edge of said inside portion of said U-shape and said lower edge of said rear portion of said seat back cover portion defining a periphery of an opening.

3. A car seat cover as recited in claim 2, further comprising
   a single elastic tape connected along said periphery of said opening.

4. A car seat cover as recited in claim 3, further comprising
   a plurality of rings attached to said elastic tape.

5. A car seat cover as recited in claim 4, further comprising
   means for connecting said plurality of rings together to tighten the seat cover about a car seat.

6. A car seat cover as recited in claim 5, further comprising
   at least one ring attached to said second continuous seam.

7. A car seat cover as recited in claim 6, further comprising
   means for connecting said plurality of rings and said at least one ring together to tighten the seat cover about a car seat.

8. A car seat cover as recited in claim 1, further comprising
   a storage means for storing said seat back cover portion, said seat cushion cover portion and said seat bottom cover portion in a folded condition.

9. A car seat cover as recited in claim 1, wherein said seat back cover portion, said seat cushion cover portion and said seat bottom cover portion are formed of an elastic material.

10. A car seat cover as recited in claim 1, wherein said lower edge of said rear portion of said back portion has first and second ends; and
   said first and second common points are located at said first and second ends, respectively, of said lower edge of said rear portion.

* * * * *